(12) United States Patent
Ema et al.

(10) Patent No.: US 9,667,089 B2
(45) Date of Patent: May 30, 2017

(54) SECONDARY COIL MODULE

(71) Applicant: Hosiden Corporation, Yao-shi (JP)

(72) Inventors: Hiroshi Ema, Yao (JP); Fumio Ohta, Osaka (JP); Eiji Sato, Yao (JP)

(73) Assignee: Hosiden Corporation, Osaka (JP)

( * ) Notice: Subject to any disclaimer, the term of this patent is extended or adjusted under 35 U.S.C. 154(b) by 182 days.

(21) Appl. No.: 14/601,646

(22) Filed: Jan. 21, 2015

(65) Prior Publication Data

US 2015/0214774 A1 Jul. 30, 2015

(30) Foreign Application Priority Data

Jan. 24, 2014 (JP) ................... 2014-011452

(51) Int. Cl.
| | |
|---|---|
| *H01J 7/00* | (2006.01) |
| *H02J 7/02* | (2016.01) |
| *H01M 10/42* | (2006.01) |
| *H01M 10/46* | (2006.01) |
| *H02J 5/00* | (2016.01) |
| *H02J 7/00* | (2006.01) |
| *H02J 50/10* | (2016.01) |
| *H01M 10/44* | (2006.01) |

(52) U.S. Cl.
CPC ........... *H02J 7/025* (2013.01); *H01M 10/425* (2013.01); *H01M 10/46* (2013.01); *H02J 5/005* (2013.01); *H02J 7/007* (2013.01); *H02J 7/0013* (2013.01); *H02J 7/0042* (2013.01); *H02J 7/0044* (2013.01); *H02J 50/10* (2016.02); *H01M 10/44* (2013.01)

(58) Field of Classification Search
CPC .... H01M 10/425; H01M 10/44; H01M 10/46; H02J 5/005; H02J 7/0013; H02J 7/0042; H02J 7/007; H02J 7/025
See application file for complete search history.

(56) References Cited

U.S. PATENT DOCUMENTS

| | | | |
|---|---|---|---|
| 2003/0210106 A1 | 11/2003 | Cheng et al. | |
| 2009/0121677 A1 | 5/2009 | Inoue et al. | |
| 2011/0086256 A1* | 4/2011 | Julstrom ................ | H01F 38/14 429/121 |
| 2014/0070762 A1 | 3/2014 | Jenwatanavet et al. | |

FOREIGN PATENT DOCUMENTS

| | | |
|---|---|---|
| JP | 2008206287 A | 9/2008 |
| JP | 2013196883 A | 9/2013 |
| WO | 2014039686 A1 | 3/2014 |

* cited by examiner

*Primary Examiner* — Vuthe Siek
(74) *Attorney, Agent, or Firm* — The Webb Law Firm

(57) ABSTRACT

Provided is a compact secondary coil module that can be easily mounted in a terminal device side unit. The secondary coil module whose power for use in charging a storage battery by a contactless charging technique is supplied via a primary coil, includes the storage battery, a charging control circuit controlling charging of the storage battery, a tubular core made of magnetic material and covering an outer circumferential face of at least one of the storage battery and the charging control circuit, and a wire made of conductive material, the wire being connected to the charging control circuit and wound around the outer circumferential face of the core.

8 Claims, 2 Drawing Sheets

SECONDARY COIL MODULE

CROSS REFERENCE TO RELATED APPLICATION

This application is based on and claims priority under 35 U.S.C. Section 119 to Japanese Patent Application No. 2014-11452 filed on Jan. 24, 2014, the entire contents of which are incorporated herein by reference.

TECHNICAL FIELD

This disclosure relates to a secondary coil module whose power for use in charging a storage battery (secondary battery) by a contactless charging technique is supplied via a primary coil.

RELATED ART

Conventionally, there has been employed a contactless charging (non-contact power charging) technique for charging power to a storage battery incorporated in a mobile terminal device without using terminal-to-terminal connection between the mobile terminal device and a charging station. As some examples of such contactless charging technique, there are known e.g. electromagnetic induction technique, radio wave technique, electromagnetic field resonance technique. In the electromagnetic induction technique, the secondary coil is provided in the terminal device and the primary coil is provided in the charging station. For power supply from the charging station to the terminal device, the charging station and the terminal device are arranged such that the primary coil and the secondary coil are placed in opposition to each other. Under this condition, with supply of electric current to the primary coil, a magnetic flux is produced in the primary coil, which magnetic flux in turn generates an electromotive force within the secondary coil by magnetic induction, thus supplying power to the storage battery. Examples of techniques relating to such electromagnetic induction technique are known from JP2013-196883A and JP2008-206287A, for instance.

A secondary battery module described in JP2013-196883A includes a secondary (storage) battery, a charging control circuit, a control board, a case member accommodating the above components, and input and output terminals exposed on an exterior face of the case member. The charging control circuit includes a resonance circuit which includes a power receiving coil provided in correspondence with a power supplying coil of a charger and a resonance capacitor connected parallel with the power receiving coil. A contactless charging electronic device described in JP2008-206287A includes a tubular outer frame, a back lid covering one side opening of the outer frame, and a secondary coil disposed on the inner side of the back lid and having thickness size in a direction of a center axis of the outer frame is smaller than a width size thereof in a direction perpendicular to the center axis and configured to generate power through electromagnetic induction of a primary coil included in an external power source.

SUMMARY

The power receiving coil described in JP2013-196883A and the secondary coil described in JP2008-206287A respectively comprise a planar coil formed by winding a length of wire coated with insulating material around and on a same flat face, with the planar coil being disposed perpendicularly under the storage battery as the terminal device incorporating the storage battery is seen from perpendicularly above the storage battery. For efficient power supply from the primary coil to the planar coil, the perpendicularly downside face of the terminal device should be oriented toward the charging station so that the storage battery is not interposed between the primary coil and the planar coil at the time of charging of the storage battery. For this reason, according to the techniques disclosed in JP2013-196883A and JP2008-206287A, consideration must be given to the mounting direction of the terminal device at the time of charging. Further, for obtaining greater power to be supplied from the charging station to the terminal device, it is conceivable to increase the number of turns of the planar coil. However, since such increase of the number of turns results in increase in the outside diameter of the planar coil, it can impose restraint on layout of the planar coil or require size increase of the terminal device incorporating the planar coil.

Embodiments of the present invention comprise a compact secondary coil module that can be easily mounted in a terminal device side unit.

A secondary coil module according to this disclosure whose power for use in charging a storage battery (secondary battery) by a contactless charging technique is supplied via a primary coil, the secondary coil module comprising the storage battery, a charging control circuit controlling charging of the storage battery, a tubular core made of magnetic material and covering an outer circumferential face of at least one of the storage battery and the charging control circuit, and a wire made of conductive material, the wire being connected to the charging control circuit and wound around the outer circumferential face of the core.

In this case, since at least one of the storage battery and the charging control circuit is enclosed within the core, it is possible to reduce the size of the secondary coil module advantageously. Further, it is also possible to change the size of the secondary coil as desired, depending on the size of the storage battery or the charging control circuit. Accordingly, the secondary coil module can be readily disposed in the terminal device-side unit.

Moreover, the tubular core can be configured such that at the time of charging of the storage battery, at least one of axial ends thereof oriented toward the primary coil is closed by a lid member made of magnetic material.

In this case, it is possible to guide the magnetic flux from the primary coil to the inside of the core in an efficient manner. Thus, it is possible to enhance the magnetism collection effect of the secondary coil module. Further, in case both the opposed axial ends of the core are closed by lid members, the inner space of the core can be shielded, so that damage to the components enclosed within the core can be suppressed.

According to a further possible configuration, the charging control circuit is provided inside the tube of the core and a board mounting the charging control circuit is mounted on the storage battery.

In this case, the board mounting the charging control circuit can be readily supported inside the core. Therefore, there is no need to provide a support structure additionally. Consequently, there occurs no size increase of the secondary coil module due to the charging control circuit.

According to a still further possible configuration, a terminal of the charging control circuit is connected via a flexible printed circuit board to an electrode of the storage battery, with the flexible printed circuit board and the electrode of the storage battery being connected to each other via a conductive tape.

In this case, the charging control circuit and the storage battery can be easily connected. Accordingly, it is possible to reduce the manufacture cost.

According to a still further possible configuration, the outer circumferential face of the core includes an output terminal to be connected to the electrode of the storage battery for outputting power stored in the storage battery.

In this case, it is possible to easily extract power stored in the storage battery and to easily connect a terminal of a component that uses this power. Therefore, convenience of the secondary coil module can be improved.

DESCRIPTION OF EMBODIMENTS

Figure 1:
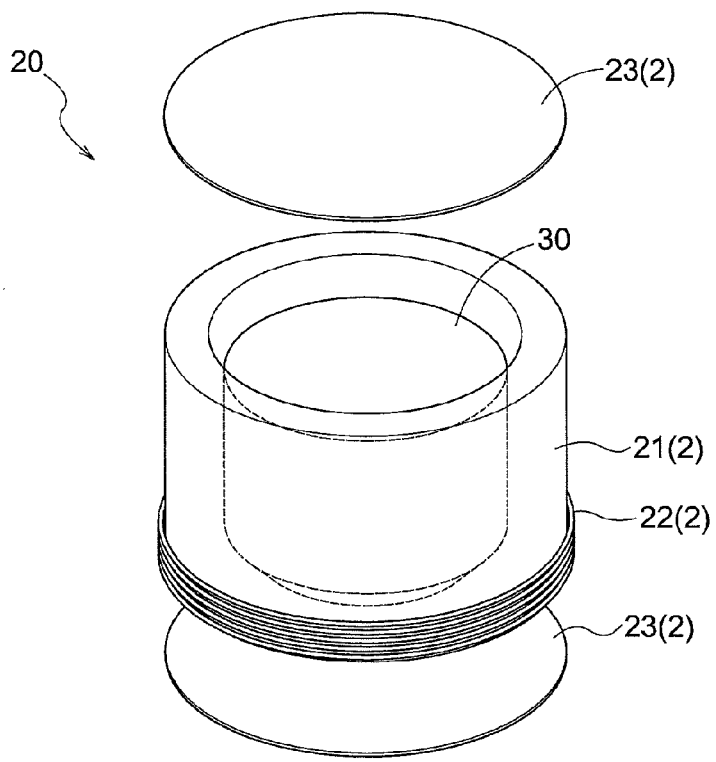
FIG. 1 is a schematic diagram showing a secondary coil included in a secondary coil module.
Figure 2:
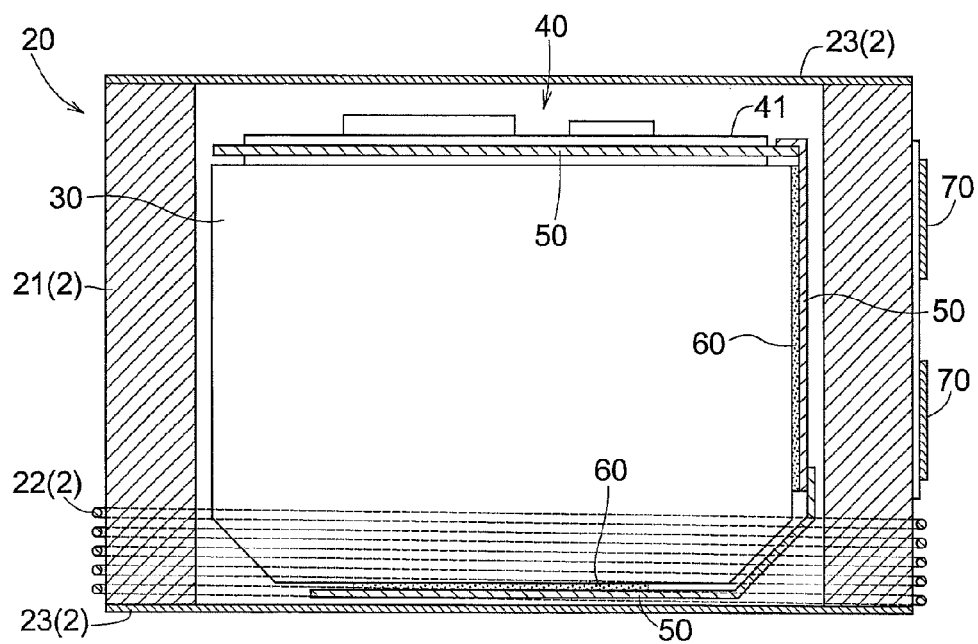
FIG. 2 is a section view showing the secondary coil module as seen from a radial outer side of a core.

A secondary coil module according to the present disclosure will be explained. This secondary coil module is included in a terminal device side unit included in a contactless charging type charging system consisting of a charger station side unit and the terminal device side unit. The module is formed compact for realizing higher degree of freedom in its disposing in the terminal device side unit. Next, a secondary coil module 20 according to the instant embodiment will be explained in details.

The secondary coil module 20 receives supply of power for use in charging a storage battery by a contactless charging technique via a primary coil 1 included in the charger station side unit. Here, the term: the contactless charging technique refers to a technique as follows. Namely, without terminal-to-terminal connection between a primary coil module 10 included in the charger station side unit and the secondary coil module 20 included in the terminal device side unit, power from an AC power source supplied to the charger station side unit is transmitted to a secondary coil 2 via a primary coil 1 included in the charger station side unit so as to charge a storage battery 30. Transmission and reception of power between the primary coil 1 and the secondary coil 2 are effected by electromagnetic induction. The secondary coil module 20 includes such secondary coil 2 described above.

1. Secondary Coil

FIG. 1 shows a schematic diagram of the secondary coil 2. As shown in FIG. 1, the secondary coil 2 includes a core 21, a wire 22 and a lid member 23. The core 21 comprises a tubular body made of magnetic material and covers an outer circumferential face of the storage battery 30. The magnetic material forming the core 21 can be e.g. a plate-like amorphous magnetic matter or a resin sheet containing magnetic matter. In this case, the plate-like amorphous magnetic matter or the resin sheet containing magnetic matter can be made into a tubular shape and with sewing of the end portions thereof, the core 21 is formed. Such sewing can be effected with using adhesive or using a tape. Alternatively, the core 21 can be formed with using soft ferrite material of ceramic type or injection molding of resin containing magnetic matter powder in a high concentration. With these, the core 21 can be formed in a tubular shape having a thickness of 1 mm or less. Further, in case the core 21 is formed with using ceramic type soft ferrite material, the heat discharging characteristics of the secondary coil 2 can be increased. Or, the core 21 can also be formed with using a resin type ferrite material. In this case, the core 21 can be formed light.

In particular, the core 21 according to the instant embodiment is formed in the tubular shape as shown in FIG. 1. The storage battery 30 is included in the secondary coil module 20 and can be e.g. a lithium-polymer battery to be subjected to charging by the contactless charging technique. The shape of the storage battery 30 is not particularly limited in the present invention. In this embodiment, however, the storage battery 30 is formed in a cylindrical shape as shown in FIG. 1. The core 21 is formed to have an inside diameter which is greater than an outside diameter of the storage battery 30 and is disposed so as to enclose the storage battery 30 from the radially outer side thereof. Further, the core 21 is also configured to have a length in its axial direction longer than an axial length of the storage battery 30.

The wire 22 is formed of conductive material and is wound around the outer circumferential face of the core 21. The conductive material forming the wire 22 can be an enameled wire for instance. The wire 22, as such enameled wire, is wound by a plurality of turns around the outer circumferential face of the core 21, thus forming an "air core inductor". Needless to say, the air core conductor can be formed by winding a length of the wire 22 by a plurality of turns and inserting the core 21 on the inner radial side of this air core conductor. The air core conductor is configured to have an axial length which is shorter than the axial length of the storage battery 30. In this embodiment, the wire 22 is wound with an offset toward one axial side of the core 21.

The lid member 23 is formed of magnetic material and closes at least one of end portions of the tubular core 21 disposed on the side facing the primary coil 1 at the time of charging of the storage battery. FIG. 1 shows an exemplary case wherein lid members 23 close both the opposed axial end portions of the core 21. The lid members 23 are provided with shapes matching the shapes of the openings of the opposed axial ends of the core 21 having the tubular shape, and in the instant embodiment, there are employed lid members 23 having a circular plate-like shape. With this, it is possible to put lids on the openings of both the opposed axial ends of the core 21. The magnetic material forming the lid members 23 can be same magnetic material which is used to form the core 21.

As described above, since the secondary coil 2 is configured to enclose the storage battery 30 therein, the secondary coil module 20 can be formed compact. Further, since the air core conductor formed by winding the wire 22 around the core 21 can have a low profile (height), with use of the storage battery 30 and/or the core 21 of similarly low profiles, it becomes also possible to form the secondary coil module 20 very thin. Therefore, such secondary coil module 20 can be readily mounted in the terminal device side unit. Meanwhile, adhesive agent can be charged between the storage battery 30, the core 21, the wire 22 and the lid members 23 respectively for bonding these together.

2. Secondary Coil Module

Next, the secondary coil module 20 according to the instant embodiment will be explained. The secondary coil module 20 is provided in the terminal device side unit of the charging system as described above. Such secondary coil module 20 includes the above-described secondary coil 2, the storage battery 30 and a board 41 mounting a charging control circuit 40 thereon. The secondary coil 2 and the storage battery 30 have already been described above; thus, further explanation thereof will be omitted.

The charging control circuit 40 is connected to the wire 22 and provided inside the tube of the core 21 for controlling charging of the storage battery 30. Power is generated in the wire 22 due to electromagnetic induction and this power is transmitted to the charging control circuit 40. Then, the charging control circuit 40 converts this power into DC power having a predefined voltage value suitable for charging of the storage battery 30.

The charging control circuit 40 described above is mounted on the board 41. In the instant embodiment, the board 41 comprises a flexible printed circuit board (FPC: Flexible Printed Circuits) 50. The board 41 is mounted on the storage battery 30 and provided within a tubular space formed by the core 21 and the lid member 23.

Terminals of the charging control circuit 40 are connected via the flexible printed circuit board 50 to electrodes of the storage battery 30, with the flexible printed circuit board 50 and the electrode of the storage battery 30 being connected to each other via a conductive tape 60. In the instant embodiment, the terminals of the charging control circuit 40 are provided on the board 41 and electric power generated in the secondary coil 2 by magnetic induction is transmitted thereto. The "electrodes" of the storage battery 30 means positive and negative electrodes provided in the storage battery 30. To these terminals of the storage battery 30, electrodes of the flexible printed circuit board 50 are connected via the conductive tape 60. And, this flexible printed circuit board 50 is connected also to the terminals of the charging control circuit 40 mounted on the board 41. With this, the terminals of the charging control circuit 40 and the electrodes of the storage battery 30 are connected to each other.

Further, on the outer circumferential face of the core 21, there are provided output terminals 70 connected to the electrodes of the storage battery 30 for outputting power stored in the storage battery 30. More particularly, on the outer circumferential face of the core 21, there are provided a pair of output terminals 70 connected respectively to the positive terminal and the negative terminal of the storage battery 30. With this arrangement, it becomes possible to readily extract the power charged in the storage battery 30.

For instance, with replacement of a storage battery housed in an existing battery case and receiving power supply by the contactless charging technique with the above-described secondary coil module 20, it becomes possible to change the power supplying method from a "non-contactless" power charging method to the contactless power charging method.

3. Modes of Charging

Figure 3:
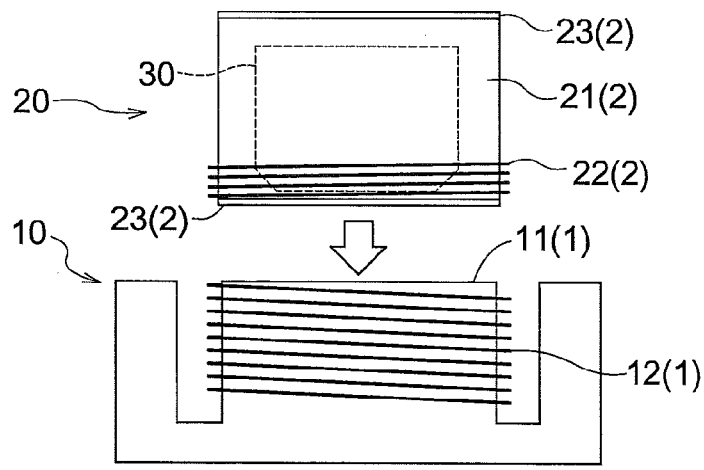
FIG. 3 is a schematic diagram illustrating a mode of charging of a storage battery.

FIG. 3 illustrates a mode of charging the storage battery 30 included in the secondary coil module 20 having the above-described configuration. As illustrated in FIG. 3, in case the primary coil module 10 included in the charger station side unit includes the primary coil 1 formed by winding the wire 12 around the core cylindrical portion 11, magnetic flux is generated along the axial direction of the cylindrical portion 11 upon power supply to the primary coil 1. Therefore, by disposing the secondary coil module 20 in such a manner that this magnetic flux passes through the inner radial side of the secondary coil 2, the power generated by the electromagnetic induction in the secondary coil 2 can be transmitted in an efficient manner. Accordingly, in case the primary coil 1 is formed by winding the wire 12 around the core cylindrical portion 11, the secondary coil module 20 will be disposed on the primary coil module 10 such that the secondary coil 2 may be located on the axis of the primary coil 1. With this, charging of the storage battery 30 becomes possible.

Figure 4:
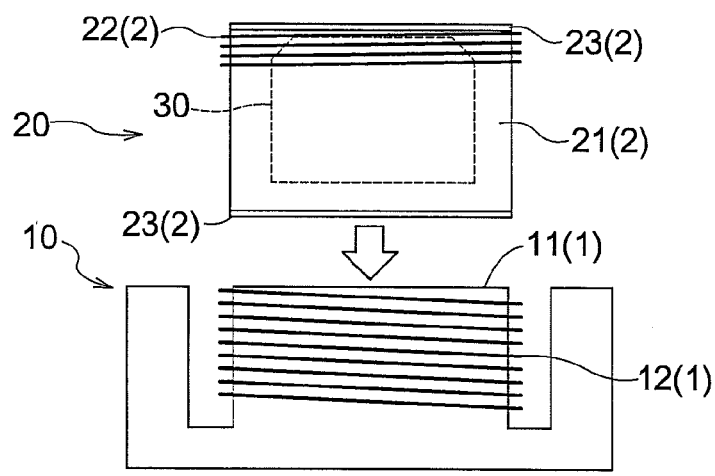
FIG. 4 is a schematic diagram illustrating a mode of charging of the storage battery.

Further, in the case of using the secondary coil module 20 according to the instant embodiment, as illustrated in FIG. 4, the secondary coil module 20 may be disposed on the primary coil module 10 such that the secondary coil 2 is located on the axis of the primary coil 1 and the side thereof having the wire 22 wound thereon is oriented to the side opposite (away from) the side of the primary coil 1. In this case too, charging of the storage battery 30 is possible.

Figure 5:
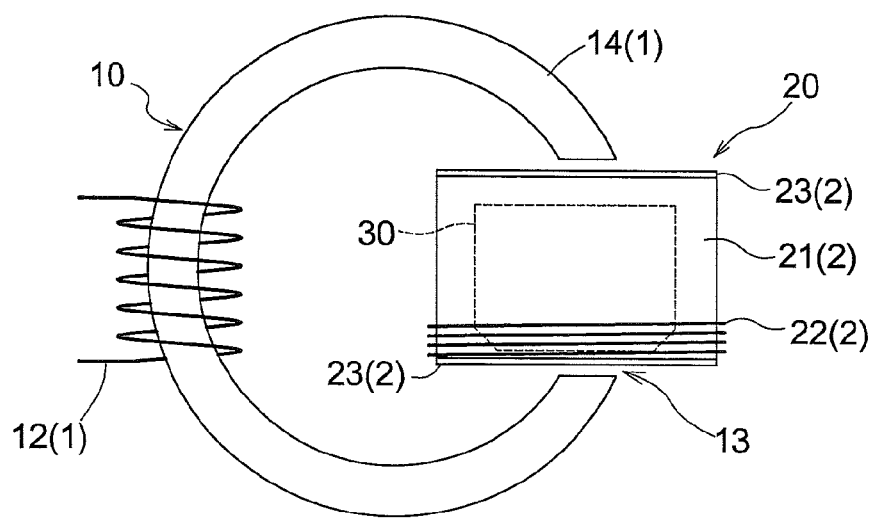
FIG. 5 is a schematic diagram illustrating a mode of charging of a storage battery.

On the other hand, as illustrated in FIG. 5, if the primary coil module 10 includes a primary coil 1 formed by winding the wire 22 around a C-shaped core 14 having a gap 13 at a portion in the circumferential direction, upon power supply to the primary coil 1, magnetic flux will be generated at the gap 13 along the circumferential direction of the core 14. Therefore, by disposing the secondary coil module 20 such that this magnetic flux may pass through the inner radial side of the secondary coil 2, power transmission by the electromagnetic induction can be transmitted in an efficient manner to the secondary coil 2. For this reason, in case the primary coil 1 is formed with using the C-shaped core 14, the secondary coil module 20 will be disposed on the primary coil module 10 such that the magnetic flux generated at the gap 13 may pass through the inner radial side of the second coil 2. With this, it becomes possible to charge the storage battery 30 in an efficient manner. Incidentally, with the arrangement of causing the magnetic flux generated at the gap 13 to pass through the inner radial side of the secondary coil 2, the side having the wire 22 wound thereon can be oriented toward either one of the circumferential end portions of the core 14 at the gap 13.

4. Other Embodiments

In the foregoing embodiment, it was explained that the wire 22 is wound with an offset toward one axial end portion of the core 21. However, it is also possible to wind the wire 22 uniformly with respect to the axial direction of the core 21. With this alternative arrangement too, the secondary coil module 20 can be configured as described above.

In the foregoing embodiment, it was explained that the both the opposed axial end portions of the tubular core 21 are closed by the lid members 23 made of magnetic material. However, it is also possible to configure such that at the time of charging of the storage battery, only the one of the opposed axial end portions of the tubular core 21 oriented to face the side of the primary coil 1 is closed by the lid member 23 or that both the opposed axial end portions of the tubular core 21 are not closed by the lid members 23 at all.

In the foregoing embodiment, it was explained that the core 21 covers the outer circumferential faces of the storage battery 30 and the charging control circuit 40. Instead, it is also possible for the core 21 to cover the outer circumferential face of only one of the storage battery 30 and the charging control circuit 40. For instance, in case the core 21 is configured to cover the outer circumferential face of the storage battery 30 alone, the board 41 mounting the charging control circuit 40 will be disposed outside the tube of the core 21.

In the foregoing embodiment, it was explained that the board 41 is mounted on the storage battery 30. Instead, the board 41 can be disposed inside the tube with being afloat the storage battery 30.

In the foregoing embodiment, it was explained that the terminals of the charging control circuit 40 are connected to the electrodes of the storage battery 30 via the flexible printed circuit board 50. Instead, this connection can be made with using wires. Further, in the foregoing embodiment, it was explained that the flexible printed circuit board 50 and the electrodes of the storage battery 30 are connected via the conductive tape 60. Instead, this connection can be realized with use of a socket or the like for instance.

In the foregoing embodiment, it was explained that on the outer circumferential face of the core 21, there are provided the output terminals 70 connected to the electrode of the storage battery 30 for outputting power charged in the storage battery 30. Instead, the output terminal 70 can be provided in some other portion.

In the foregoing embodiment, it was explained based on an example using the electromagnetic induction method as the contactless power charging method. Alternatively, the secondary coil module according to this disclosure can be applied to the electromagnetic field resonance technique, or the secondary coil 2 can be used as a coil of an antenna component also. In this case, the inventive coil module can be described as a coil comprising a tubular core covering an outer circumferential face of a storage battery made of magnetic material included in the antenna component, and a length of wire wound around the outer circumferential face of the core and made of conductive material. Needless to say, both the axial opposed ends of the tubular core can be closed by lid members made of magnetic material.

The above-described component for use in the contactless charging technique will be configured to satisfy predetermined specifications or requirements. And, the secondary coil module according to this disclosure can be configured to satisfy such specifications or requirements or not to satisfy the same, as desired.

This disclosure is applicable to a secondary coil module whose power for use in charging a storage battery (secondary battery) by a contactless charging technique is supplied via a primary coil.

The invention claimed is:

1. A secondary coil module, comprising:
    a storage battery;
    a charging control circuit controlling charging of the storage battery;
    a tubular core made of magnetic material and covering an outer circumferential face of at least one of the storage battery and the charging control circuit; and
    a wire made of conductive material, the wire being connected to the charging control circuit and wound around the outer circumferential face of the core,
    wherein the secondary coil module is disposed relative to a primary coil such that power is generated in the wire by electromagnetic induction, transmitted to the charging control circuit, and converted to DC power for charging the storage battery, and
    wherein the tubular core is configured such that at a time of charging of the storage battery, at least one axial end of the tubular core is oriented towards the primary coil and is closed by a lid member made of magnetic material.

2. The secondary coil module according to claim 1, wherein the charging control circuit is provided inside the tube of the core; and
    a board mounting the charging control circuit is mounted on the storage battery.

3. The secondary coil module according to claim 2, wherein a terminal of the charging control circuit is connected via a flexible printed circuit board to an electrode of the storage battery, with the flexible printed circuit board and the electrode of the storage battery being connected to each other via a conductive tape.

4. The secondary coil module according to claim 3, wherein the outer circumferential face of the core includes an output terminal to be connected to the electrode of the storage battery for outputting power stored in the storage battery.

5. The secondary coil module according to claim 2, wherein the outer circumferential face of the core includes an output terminal to be connected to the electrode of the storage battery for outputting power stored in the storage battery.

6. The secondary coil module according to claim 1, wherein a terminal of the charging control circuit is connected via a flexible printed circuit board to an electrode of the storage battery, with the flexible printed circuit board and the electrode of the storage battery being connected to each other via a conductive tape.

7. The secondary coil module according to claim 6, wherein the outer circumferential face of the core includes an output terminal to be connected to the electrode of the storage battery for outputting power stored in the storage battery.

8. The secondary coil module according to claim 1, wherein the outer circumferential face of the core includes an output terminal to be connected to the electrode of the storage battery for outputting power stored in the storage battery.

* * * * *